(12) United States Patent
Choi (10) Patent No.: US 8,833,664 B2
(45) Date of Patent: Sep. 16, 2014

(54) ENHANCED PERFORMANCE AND SECURITY RFID DEVICE

(76) Inventor: Yu Yung Choi, Brooklyn, NY (US)

(*) Notice: Subject to any disclaimer, the term of this patent is extended or adjusted under 35 U.S.C. 154(b) by 603 days.

(21) Appl. No.: 12/968,856

(22) Filed: Dec. 15, 2010

(65) Prior Publication Data

US 2011/0147467 A1 Jun. 23, 2011

Related U.S. Application Data

(60) Provisional application No. 61/288,263, filed on Dec. 18, 2009.

(51) Int. Cl.
| | |
|---|---|
| G06K 19/06 | (2006.01) |
| H04Q 5/22 | (2006.01) |
| G08B 13/14 | (2006.01) |
| H01Q 1/52 | (2006.01) |
| H01Q 1/22 | (2006.01) |
| G06K 19/073 | (2006.01) |
| H01Q 9/24 | (2006.01) |
| G06K 19/077 | (2006.01) |
| H01Q 3/20 | (2006.01) |
| H01Q 9/26 | (2006.01) |

(52) U.S. Cl.
CPC ............ *H01Q 9/26* (2013.01); *H01Q 1/526* (2013.01); *H01Q 1/2225* (2013.01); *G06K 19/07327* (2013.01); *H01Q 9/24* (2013.01); *G06K 19/07786* (2013.01); *H01Q 3/20* (2013.01)
USPC ....... 235/492; 235/487; 340/10.1; 340/572.1; 340/572.3; 340/572.8; 343/841

(58) Field of Classification Search
CPC ............... G06K 19/07749; G06K 19/07771; G06K 19/0775; G06K 19/07767; G06K 19/07779; G06K 19/07783; G06K 19/07784; G06K 19/07786; G06K 19/0779; G06K 19/07794; G06K 19/073; G06K 19/07309; G06K 19/07318; G06K 19/07327; G06K 19/07345; G06K 5/02; G06K 5/0208; G06K 5/0252; H04K 3/38; H04K 2203/20
USPC .............. 235/375, 380, 383, 487, 492; 340/10.1–10.4, 572.1–572.8; 343/841
See application file for complete search history.

(56) References Cited

U.S. PATENT DOCUMENTS

| | | | | |
|---|---|---|---|---|
| 5,031,027 | A | * | 7/1991 | Dorinski et al. ............. 257/660 |
| 6,121,544 | A | | 9/2000 | Petsinger |
| 7,083,083 | B2 | * | 8/2006 | Droz ............................ 343/841 |
| 7,170,415 | B2 | | 1/2007 | Forster |
| 7,298,330 | B2 | | 11/2007 | Forster et al. |
| 7,388,503 | B2 | | 6/2008 | Posamentier |
| 7,479,882 | B2 | | 1/2009 | Mahaffey |

(Continued)

*Primary Examiner* — Thien M Le
*Assistant Examiner* — April Taylor (57) ABSTRACT

The present invention is directed to a selectively accessible enhanced radio-frequency identification (RFID) device, that is enhanced performance and security by being selectively responsive to predetermined electromagnetic interrogation thereof, that comprises an enhanced component for enabling a user to adjust and/or increase readable distances and selectively enable or disable interrogatory access to the enhanced RFID device, to protect from unauthorized interrogation thereof. The inventive enhanced RFID device comprises an antenna, a microchip and at least one enhanced component. The enhanced component may use "Electromagnetic Induction" to the antenna to increase performance (increase readable distances) and "Electromagnetic Shield", to cover the antenna (for turn Off the RFID device). Therefore, the enhanced RFID device of the present invention provides an inventively user controllable, two functions in one of enhanced component, for enhanced performance and greater level of data security advantageously balanced with convenience.

20 Claims, 4 Drawing Sheets

(56) References Cited

U.S. PATENT DOCUMENTS

| | | | |
|---|---|---|---|
| 7,631,812 B2* | 12/2009 | Williams et al. | 235/487 |
| 7,635,089 B2 | 12/2009 | Augustinowicz et al. | |
| 7,652,636 B2 | 1/2010 | Forster et al. | |
| 7,701,408 B2* | 4/2010 | Bombay et al. | 343/841 |
| 7,719,425 B2 | 5/2010 | Colby | |
| 7,724,136 B2 | 5/2010 | Posamentier | |
| 8,091,208 B2* | 1/2012 | Finn | 29/600 |
| 8,333,320 B2* | 12/2012 | Huot et al. | 235/382 |
| 8,487,828 B2* | 7/2013 | Bombay et al. | 343/841 |
| 2003/0080917 A1* | 5/2003 | Adams et al. | 343/841 |
| 2005/0093678 A1* | 5/2005 | Forster et al. | 340/10.1 |
| 2005/0236489 A1* | 10/2005 | Droz | 235/487 |
| 2006/0017570 A1 | 1/2006 | Moskowitz et al. | |
| 2006/0187061 A1 | 8/2006 | Colby | |
| 2007/0090954 A1* | 4/2007 | Mahaffey | 340/572.3 |
| 2007/0109130 A1* | 5/2007 | Edenfield | 340/572.8 |
| 2008/0055093 A1 | 3/2008 | Shkolnikov et al. | |
| 2008/0186186 A1* | 8/2008 | Campbell | 340/572.8 |
| 2008/0210763 A1* | 9/2008 | Huot et al. | 235/492 |
| 2008/0284606 A1 | 11/2008 | Liu et al. | |
| 2008/0303632 A1 | 12/2008 | Hammad | |
| 2009/0184824 A1 | 7/2009 | Forster | |
| 2009/0224056 A1 | 9/2009 | Kwon | |
| 2009/0309703 A1 | 12/2009 | Forster | |
| 2010/0014270 A1 | 1/2010 | Liu | |
| 2010/0096181 A1 | 4/2010 | Nakamura et al. | |
| 2010/0224402 A1 | 9/2010 | Lim et al. | |
| 2010/0230498 A1 | 9/2010 | Atherton | |
| 2011/0272464 A1* | 11/2011 | Rancien et al. | 235/488 |

\* cited by examiner (Prior Art)

ENHANCED PERFORMANCE AND SECURITY RFID DEVICE

CROSS-REFERENCE TO RELATED APPLICATIONS

The present patent application claims priority from the U.S. Provisional Patent Application No. 61/288,263, filed on Dec. 18, 2009, which is hereby incorporated by reference in its entirety.

FIELD OF THE INVENTION

The present invention relates to radio-frequency identification (RFID) device, such as RFID inlay, tag, label, sticker, ticket, or other configurations. More particularly, the invention provides enhanced component for user-controlled means for increase/change readable distances and enabling/disabling the RFID device to prevent from unauthorized interrogation to the RFID device.

BACKGROUND OF THE INVENTION

In recent years, there has been an accelerated growth in the use of RFID device for inventory and facility control and management, for product tracking during transportation (e.g., throughout a supply chain), such as ultra high frequency (UHF) passive RFID tag, requires RFID device have high performance (e.g., readable distances, readable rates), for security purposes (e.g., after supply chain (e.g., after point of sale, after-market), access control), and to facilitate various forms of electronic information interchange (for example in data security, such as consumer privacy concern).

However, conventional RFID devices suffer from a serious disadvantage—the readability of distances and rates of the performance, beside these. Specifically, an unauthorized party (with a compatible RFID reader or equivalent) who is within a predefined interrogation range of a typical RFID device may be able to access, delete, and possibly even alter the data stored in the RFID device, or track people. Clearly, this disadvantage becomes a critical issue in certain RFID applications, such as security and/or merchandise, in which product's information may be stored in the RFID device, and thus be subject to access and/or misappropriation by unauthorized third parties. The lack of protection against undesirable interrogation is of particular concerns with respect to RFID device access challenges. Also, there were contradictions between the readable distances and the security challenges.

Concerns over the abovementioned significant vulnerabilities of RFID device, and over RFID device-related increase performance and privacy considerations in general, have spurred the development of techniques to permanently disable (e.g., the microchip have a kill function) an operational RFID device after a certain event has occurred (for example, after an RFID tagged product has been sold to the consumer). However, such a crude "solution" does not in any way address the numerous applications in which further use of the RFID device is necessary after the event, nor does it address the applications in which it may be desirable to keep an RFID device in an inactive mode until after a particular predetermined event occurs. Such applications may include, but are not limited to, situations in which the RFID device's information should be protected from surreptitious and/or unauthorized reading until after the RFID device tagged product has been purchased, or the RFID device is otherwise authorized for access.

In order to address the above challenges, a number of solutions, described in greater detail below, have been proposed in recent years. However, each of those solutions suffers from one or more serious disadvantages, and none of the previously known solutions adequately address the full extent of the abovementioned challenges. It would be helpful to provide a brief overview below of the various types of such attempted, but ultimately commercially unsuccessful solutions.

First, by way of example, referring to the U.S. Pat. No. 7,298,330, entitled "RFID tag with enhanced readability," references propose an RFID device has conductive material near it. The conductive material that is not a part of the RFID device (that is part of an object that the RFID device is attached to), that cooperates with the RFID device to enhance its performance. The RFID device does not have the enhance performance function itself, and it only reacts when near conductive materials.

Referring now to U.S. Pat. Nos. 7,277,016 and 7,253,734, both entitled "System and Method For Altering or Disabling RFID Tags," both references propose solutions in which at least a portion of the antenna in the RFID device is physically damaged or otherwise physically compromised or covered sufficiently to: either reduce the interrogation range of the RFID device (i.e., the range at which it can be accessed), or to disable access to the RFID entirely. However, these RFID devices may still be subjected to unauthorized interrogation (albeit at a shorter range), and are difficult, if not impossible to re-use.

Referring now to U.S. Pat. No. 7,719,425, entitled "Radio frequency shielding," references propose an RFID tag and shielding material configured to shield the RFID tag when the passport cover is closed, and configured to allow reading of the RFID tag when the passport cover is open. However, this shielding configured is limited for passport (or ID card) use to short range reading, and did not provide enhance performance for the variable readable distance and various usage.

Finally, referring now to U.S. Patent Application Pub. No. US2008/0084309, entitled "Revealable RFID Devices," this reference proposes the use of conductive material positioned over a part of the RFID device antenna, or that completely covers the entire RFID device (rendering it effectively inoperable) until it is removed, thus "revealing" the device. Thus, while this reference may provide a solution for keeping the RFID device inoperable until a certain event, it prevents the disclosed RFID tag from being used in an entire range of applications in which it is necessary to use the RFID device until a certain event occurs—not only the other way around. For example, during multiple key stages of their production and distribution, products supplied with the above-described RFID device would be of no use—they are fabricated, stored, and then transported from a manufacturer to a retailer, all without being able to utilize the RFID device for tracking/management purposes until conductive material is removed from the tag, revealing its antenna, and thus undesirably bringing all of the above-described access vulnerabilities and security flaws into play.

It would thus be desirable to provide an advantage for user-controllable enhanced RFID device. It may be implemented as an RFID inlay, tag, label, sticker, ticket. The enhanced RFID device comprises of enhanced component, for user's ability to increase performance by changing variable readability of distances and capability of user-selectable operation in one of a plurality of modes, wherein in a first mode the enhanced RFID device would be responsive to predetermined electromagnetic interrogation thereof, and wherein in a second mode the enhanced RFID device would be unresponsive to any interrogation. It would also be desirable to provide an enhanced RFID device that is operable to be selectively placed in an "ON" mode in which it is freely accessible until switched, by a user, to an "OFF" mode in which the enhanced RFID device is no longer accessible. It would furthermore be desirable to provide an enhanced RFID device with a retention component to keep it in an "Always-ON" or "Always-OFF" mode, and that is operable by the user to selectively switch the enhanced RFID device from an "Always-OFF" mode in which the device is not accessible to an "Always-ON" mode. It would additionally be desirable to provide an RFID device having a retention component that is easy and inexpensive to fabricate (e.g., roll-to-roll processing), that is readily accessible to, and operable by, the user, that is reliable, and that does not damage the enhanced RFID device in which it is implemented after repeated use. It would furthermore be desirable to provide an enhanced RFID device to increase the performance, such as increase and/or change readable distances, and the readable rates' additional capabilities.

SUMMARY OF THE INVENTION

The apparatus and method of the present invention address and resolve all of the disadvantages and laws of the previously known attempted solutions, and provide heretofore unavailable functionality, by advantageously providing a novel user-controllable enhanced RFID device that may be implemented as an electromagnetically RFID inlay, tag, label, sticker, ticket, (or equivalent), that is two functions in one. The enhanced component has the capability for increased performance of readable distances and user-selectable operation in one of the modes, wherein in a first mode, the inventive RFID device is responsive to predetermined electromagnetic interrogation thereof, and wherein in a second mode, the inventive enhanced RFID device is unresponsive to any interrogation. In accordance with the present invention, the novel enhanced RFID device is also operable with a retention component to be selectively kept in an "Always-ON" mode in which it is freely accessible until switched (for example, by a user— such as a consumer purchasing an RFID tagged product), to an "Always-OFF" mode in which the enhanced RFID device is no longer accessible by interrogation.

Advantageously, the enhanced component in various embodiments of the present invention comprises of integrated "Electromagnetic Induction" and "Electromagnetic Shield"—two functions in one, to increase the RFID device performance (e.g., readable distances and rates) and to ensure for cover of the antenna and the electronic component in the Always-OFF mode.

The enhanced RFID device comprises of an electronic component (microchip) operable for storing data (and/or for performing other functions) connected to an antenna, juxtaposed adjacent to the enhanced component(s). The antenna is located in the antenna-side (A-side), and the enhanced component(s) is located in the enhanced-side (E-side). A fold line with an adjustable folding angle is located between the A-side and the E-side.

The enhanced component(s) juxtaposed adjacent the side of the antenna which extends the antenna effect area. In the UHF antenna, for example, they are not connected to each other, but they can still be effective by electromagnetic induction to increase the enhanced RFID device performance; it can adjust the folding angle to change the readability of distances. The area, shape and size of the enhanced component may be smaller, equal or larger than the antenna, to cover (stack together) the antenna. When E-side fold is closed onto A-side with the fold line (it can be folded from either side, up or down, from 180 to 0 degree, or from 180 to 360 degrees), it will become an "Electromagnetic Shield" to switch the enhanced RFID device to an OFF mode. When the E-side is remove from the A-side the enhanced RFID device will be turned to ON mode.

Furthermore, various embodiments of the inventive enhanced RFID device may provide retention component with advantageous features thereto, including, but not being limited to, at least a portion of the following:

(1) Provision of re-stick element to keep the E-side and the A-side sticking together, so it can be reopened if needed, which allows user to turn ON and OFF the enhanced RFID device.

(2) Provision of lock element, when the E-side and the A-side is closed together, it will lock the one side into the lock element to keep the enhanced RFID device in Always-OFF mode.

(3) Provision of sleeve element, when the E-side and the A-side is closed together, it will insert one side into the sleeve element to keep the enhanced RFID device in Always-OFF mode.

(4) Provision of tab element, when the E-side and the A-side is closed together, it will fold over to the back of the A-side to stick and keep the enhanced RFID device in an Always-OFF mode.

(5) Provision of paste element, for one side of the enhanced RFID device to be fixed on the product (or object), and keep another side removable to make enhanced RFID device ON or OFF.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein like reference characters denote corresponding or similar elements throughout the various figures.

DETAILED DESCRIPTION OF PREFERRED EMBODIMENTS

The apparatus of the present invention are directed to a selectively accessible enhanced RFID device (that may be implemented as an RFID inlay, tag, label, sticker, ticket, and/or embedded integrated into a product), that is selectively responsive to predetermined electromagnetic interrogation thereof, that comprises a novel enhanced component for increase and/or change readable distances performance and enables a user to selectively enable and/or disable interrogatory access to the enhanced RFID device, to protect from unauthorized interrogation thereof.

In summary, the inventive enhanced RFID device comprises of an antenna and a microchip in the antenna-side (A-side), then at least one enhanced component in the enhanced-side (E-side). A fold line with an adjustable angle between the A-side and the E-side. The enhanced component is located juxtaposed adjacent to the antenna to increase electromagnetic effect. It will increase up to 60% or more of readable distances of the same antenna (depending on the antenna and enhanced component design), such as UHF type antenna. The A-side and E-side can also be adjusted at the angle to change the readable distances. The enhanced component may be advantageously utilized to cover the antenna to shield electromagnetic interrogation by folding either side of A-side or E-side to close enhanced RFID device together.

In this exemplary embodiment of the enhanced RFID device, used in conjunction with consumer products, when a consumer purchases a product that has been provided with the enhanced RFID device, they move (e.g., rip off, fold) the E-side to cover the A-side to change the previous Always-ON mode to an Always-OFF mode. Therefore, the enhanced RFID device of the present invention provides a greater level of data security advantageously balanced with convenience—the inventive enhanced RFID device is freely accessible prior to acquisition thereof by a user, and is thereafter easily made secure by the user, who is provided with the capability of readily and selectively enabling access to the data stored therein.

Prior to describing embodiments of the present invention in greater detail, it should be noted that in all embodiments of the present invention, electronic component capable of storing secure data (and/or of performing other functions) is referred to as "microchip" for the sake of convenience, and by way of example only. It should be understood to one skilled in the art that any electronic component with functionality equivalent to that of an integrated circuit microchip or microchip may be formed in various format of the present invention (e.g., printable electronics, printed chip, printed RFID) as a matter of design choice or convenience without departing from the spirit of the invention.

Additionally, it should be noted that a generally rectangular shape of the various embodiments of the novel enhanced RFID device of the present invention is shown in various figures by way of example only, and is not intended as a limitation on the size and shape thereof. Therefore, the enhanced RFID device may be readily sized and shaped as a matter of design choice without departing from the spirit of the invention. For example, the enhanced RFID device may be square, circular, oval, or any other geometric shape, and/or it may range in size from a small postage stamp to a large document.

Figure 1:
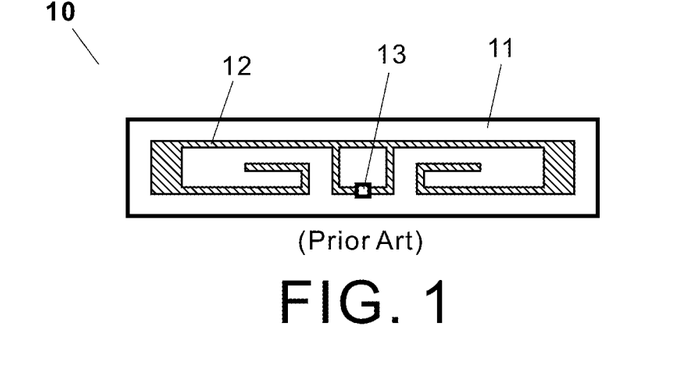
FIG. 1 is a plan view of a common RFID device (Prior Art)

Referring now to FIG. 1 is a plan view of a common UHF RFID device 10 (Prior Art), comprises a microchip 13 operable for storing data connected with an UHF type antenna 12 on the substrate 11. The antenna 12 may be formed by printing, etching, through film deposition, etc., utilizing a conductive material. The substrate 11 may be formed by paper, plastic film, plastic foil, polyester film (e.g., PET, PVC, PE) etc. In this prior art of RFID device 10 shown is an UHF RFID inlay type. It is usually directly use, or converted to the tag, label, ticket, sticker, card, or embedded integrated into a product.

Figure 2:
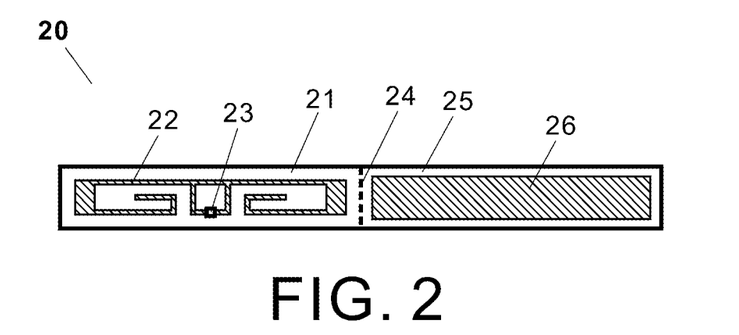
FIG. 2 is a plan view of a first exemplary embodiment of inventive enhanced RFID device, illustrating an enhanced component juxtaposed adjacent to the antenna.

Referring now to FIG. 2 is a plan view of a first exemplary embodiment of the inventive enhanced RFID device 20, comprise a microchip 23 operable for storing data (and/or for performing other functions) connected with an UHF type antenna 22, juxtaposed adjacent to an enhanced component 26 on the same or different layer of dielectric material substrate. The antenna 22 is located in the antenna-side (A-side) 21; the enhanced component 26 is located in the enhanced-side (E-side) 25. A fold line 24 with a plane included angle (not shown, but here it is 180 degrees) is between the A-side 21 and the E-side 25.

The microchip 23 may be formed by printable electronics technology to printed electronics on the same layer (or different layer) of substrate. The antenna 22 and the enhanced component 26 may utilize the same (or different) conductive material (e.g., aluminum, copper, silver, silver ink) formed on the same layer (or different layer) by including, but not limited to, printing, etching or through film deposition on the dielectric material substrate, such as paper, plastic film, plastic foil, polyester film (e.g., PET, PVC, PE). Further, the entire enhanced RFID device may also utilize printed electronics, and/or Roll-to-roll processing.

The enhanced component 26 may be formed by electrically conductive material configured in one of metallic fiber, foil, sheet, and mesh. The E-side 25 may be formed by aluminum-foil paper and/or film.

The enhanced RFID device 20 may be formed by monolayer or multilayer paper, synthetic, plastic film, plastic foil, polyester film (e.g., PET, PVC, PE) as an individual inlay, or converted to a tag, label, sticker, ticket and card. The enhanced RFID device 20 can be passive, semi-passive and active type, operating frequencies are generally in four main frequency bands of LF, HF, UHF and MW.

The enhanced RFID device 20 may be formed by separate fabrication of the A-side 21 and E-side 25, using same (or different) material (such as paper, wooden, synthetic, plastic film, plastic foil, polyester film, cloth, fabric, leather) then combining two side together from the fold line 24 to make a combination of enhanced RFID device 20.

The enhanced component 26 is juxtaposed adjacent to antenna 22 in the E-side 25 and A-side 21, which extends the antenna effect area. Although they are not connected to each other, they can effectively increase the enhanced RFID device 20 performance by electromagnetic induction. Further, for UHF type antenna 22, when the enhanced component 26 is juxtaposed adjacent to a side of antenna 22, the side that is furthest from the microchip 23, will get the greatest effect.

The E-side 25 and the A-side 21 can be folded from the fold line 24 and closed on both sides at the same time, which has a plane included angle from the fold line 24. The angle can be 0-360 degrees (it may fold from either side, fold up or fold down). The enhanced RFID device 20 performance will change by the angle's degree. When the angle's degree is 180 the readable range will be the furthest distances. When the angle's degree is 0 or 360 the readable range will be almost zero depending on the enhanced component 26's area, shape and size. It may range from being smaller than antenna 22 to being 10-times larger.

When E-side 25 is folded and closed to A-side 21 from the fold line 24, and enhanced component 26 is bigger than antenna 22 area to completely cover (or stack together) the antenna 22, it will become an "Electromagnetic Shield," which switches the enhanced RFID device 20 to OFF mode. When the E-side 25 is moved open from the A-side 21, the enhanced RFID device 20 will become ON mode. If the area or shape of enhanced component 26 does not completely cover the antenna 22, it will reduce the readable distances, which means it is not completely OFF. Otherwise, if the area of enhanced component 26 is too big, it will easily shield the other RFID device's antenna when they are close to each other.

Figure 3:
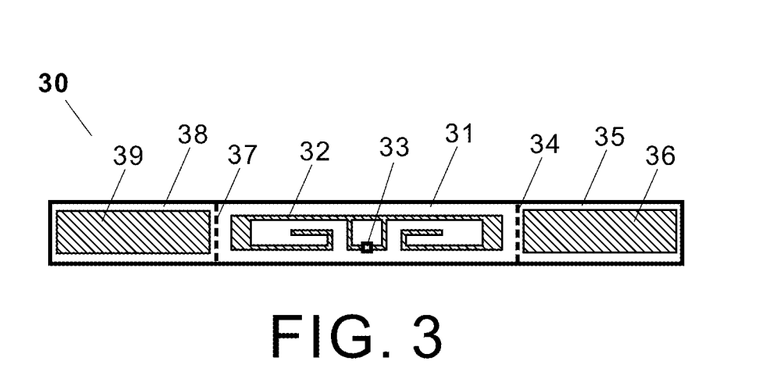
FIG. 3 is a plan view of an alternate enhanced RFID device of FIG. 2, illustrating two enhanced components juxtaposed adjacent to the antenna.

Referring to FIG. 3 is a plan view of an alternate embodiment of the enhanced RFID device 20 of FIG. 2, comprises a microchip 33 operable for storing data (and/or for performing other functions) connected with antenna 32 and two enhanced components 36 and 39. The A-side 31 is adjoining to the two E-side 35 and 38, two fold lines 34, 37 with plane included angles (not shown, but here it is 180 degrees) between the A-side 31 and the E-side 35 and 38.

The total area of the enhanced component 36 and 39 may cover the antenna 32 when the E-side 35 and 38 are to the A-side 31 by folding and closing the fold line 34 and 37, to switch enhanced RFID device 30 to the OFF mode. When the E-side 35 and 38 are moved open from the A-side 31, the enhanced RFID device 30 will become ON mode. Further, either side of E-side 35 or 38 may be used to cover part of A-side 31 or whole A-side 31, to adjust the readable distances, for example the enhanced component 36 is cover ⅓ of antenna, and the enhanced component 39 is cover ⅔ of antenna, to make different performance.

Figure 4:
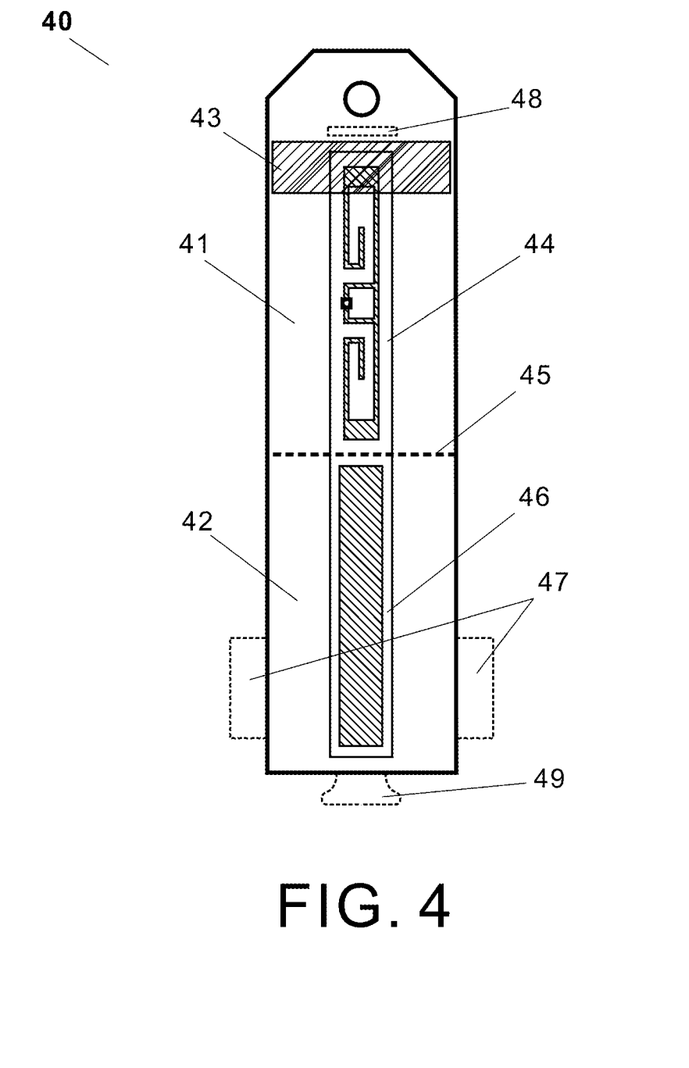
FIG. 4 is a plan view of a second exemplary embodiment of novel enhanced RFID device from FIG. 2 with a hang tag, illustrating a re-stick element.

Referring now to FIG. 4 is a plan view of a second exemplary embodiment of the novel enhanced RFID device 20 of FIG. 2 showing an inlay converted into a hang tag 40. The tag 40 had two parts divided by the fold line 45, the top-part 41 and the bottom-part 42. The enhanced RFID device 20 of FIG. 2 is placed in/on the tag 40, the A-side 44 in the top-part 41 and the E-side 46 in the bottom-part 42 (or upside down); they are both folded from the same fold line 45. The default setting for both parts of folding angle is 180 degrees in order to reach the best readable range. The bottom-part 42 is folded and closed to the top-part 41, and is stuck to the re-stick element 43, to switch OFF the tag 40. Both parts of the angles will be 0 or 360 degrees. Also it can reopen (release) the bottom-part 42 from the top-part 41 if needed, which allows user to switch ON and OFF the tag 40. For example, consumers bought a coat (already tagged) after the point of sale, then switch OFF the tag 40. In the case that he/she needs to return that coat, the consumer will switch ON the tag 40 to verify the information of the coat. Alternatively, the tag 40 by default is in Always-OFF mode.

The tag 40 may utilize including, but not limited to, paper, plastic (e.g., PET, PVC, BOPP, PE, PS, Polyamide, Vinyl), cloth, leather, wooden, Synthetic Fabric or any combination of said material formed to the shape of rectangular, square, circular, oval, or any other geometric shape. The tag 40 may use a graphic printed (e.g., letter, barcode, picture) tag, hang tag, ticket, label, sticker and integrated tag.

The RFID device 20 of FIG. 2 may be formed by embedded integrated (e.g., printed, laminated) in/on the tag 40 or embedded an inlay (e.g., stick on, laminated in) in/on the tag 40.

The tag 40 may be formed by directly printing, sticking, or laminating the enhanced component in/on the E-side 46 (or bottom-part 42), and putting the common RFID device 10 of FIG. 1 in/on the A-side 44 (or top-part 41), to make a combination of enhanced RFID device.

The tag 40 may be formed by separate fabrication of the top-part 41 and bottom-part 42, using same material or different material, and then combining the two sides together with the fold line 45 to make a combination of enhanced RFID device.

The re-stick element 43 may be placed on the one side or both sides (opposite of the fold line 45 (not shown)) of the tag 40. The re-stick element 43 includes, but not limited to, re-stick glue (or adhesive), hook-and-loop fastener, snap button and equivalent retention component.

The tag 40 may alternatively have re-stick element of tab element 47 on the side of the bottom-part 42. When the tag 40 is closed, the tab element 47 can fold over to the back of the top-part 41 to stick and keep the tag 40 in an Always-OFF mode.

The tag 40 may alternatively have re-stick element of tab-lock 49 on the bottom of the bottom-part 42. When the tag 40 is closed, the tab-lock 49 can lock into the slit 48 to keep the tag 40 in an Always-OFF mode.

Figure 5:
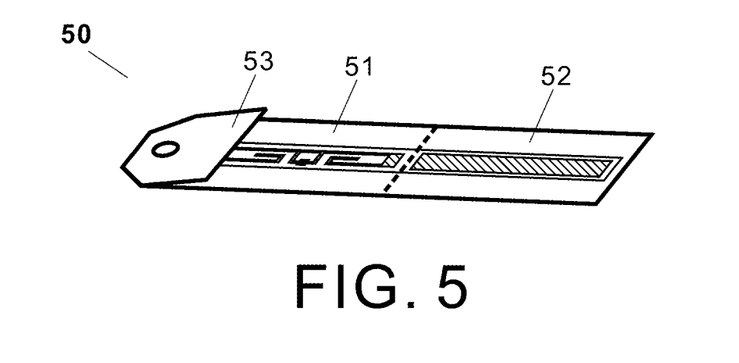
FIG. 5 is a side view of alternate embodiment of an enhanced RFID device hang tag of FIG. 4, illustrating a lock element.

Referring to FIG. 5, it is a side view of alternate embodiment of the enhanced RFID device tag 40 of FIG. 4. Showing a lock tag 50, on the top-part 51 is a lock element 53, when the bottom-part 52 is closed, it will lock the bottom-part 52 into the lock element 53 to keep the tag 50 in an Always-OFF mode. The lock element 53 may be any kind and shape of lock, and located on any part of an enhanced RFID device, including the part of product (object) with a lock element 53 function and equivalent retention component.

Figure 6:
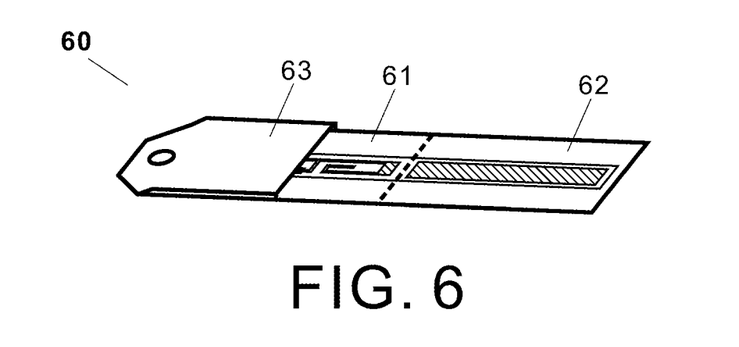
FIG. 6 is a side view of alternate embodiment of an enhanced RFID device hang tag of FIG. 4, illustrating a sleeve element.

Referring to FIG. 6, it is a side view of an alternate embodiment of the enhanced RFID device tag 40 of FIG. 4. It shows a sleeve tag 60, on the top-side 61 has a sleeve element 63, and when the bottom-part 62 is closed, it will insert the bottom-part 62 into the sleeve element 63 to keep the tag 60 in an Always-OFF mode.

Figure 7:
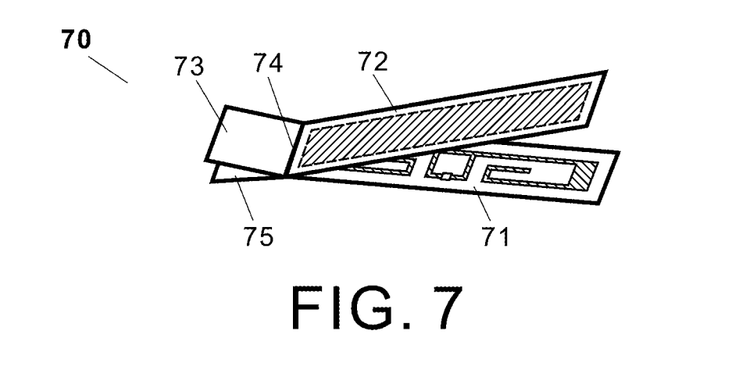
FIG. 7 is a side view of third exemplary embodiment of novel enhanced RFID device 20 of FIG. 2, illustrating a structure of a combine label.

Referring now to FIG. 7 is a side view of third exemplary embodiment of the novel enhanced RFID device 20 of FIG. 2, showing an enhanced RFID device 70, the A-side 71 and E-side 72 are separated to two pieces. The A-side 71 is on the first piece 75 and the E-side 72 is on the second piece 73. Both pieces, piece 73 of E-side 72 and piece 75 of A-side 71 connect together along the fold line 74 by soldering, stick, sewing, heat welding, ultrasonic welding, etc., such as the enhanced RFID device 70 use in apparel's label, combining the said two pieces and then sewing on the product along the fold line 74 to fix the label, the said both side are flexible to stack on each other.

Figure 8:
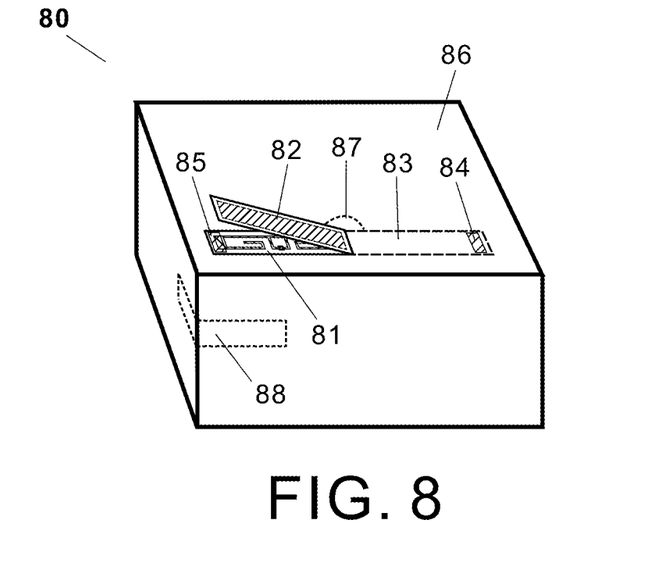
FIG. 8 is a side view of fourth exemplary embodiment of novel enhanced RFID device of FIG. 2, illustrating a label type of enhanced RFID device used on a box.

Referring now to FIG. 8 is a side view of the fourth exemplary embodiment of the novel enhanced RFID device 20 of FIG. 2, showing a label type of enhanced RFID device placed on a box 80. The default setting of the A-side 81 is stuck fixed on the box surface 86, and the E-side 82 is stuck on the paste (re-stick) element 84 in the region of the 83, when the E-side 82 is folded over to the A-side 81, it will close and stick to the paste (re-stick) element 85 to keep the enhanced RFID device in an Always-OFF mode. The A-side 81 is fixed and E-side 82 is removable (one bottom side has adhesive, while another side is kept adhesive-free). Alternatively, it may not use the paste (re-stick) element 84, and use the packaging of the cellophane to keep the E-side 82 in the region of 83. When consumers remove the cellophane, the E-side 82 can fold over to the A-side 81 to stick to the paste (re-stick) element 85 to keep the enhanced RFID device in an Always-OFF mode. There is a folding angle 87.

Alternatively the enhanced RFID device may be formed directly on the surface 86, which is a part of the box 80, and make a cutting line for the region of the 83 as E-side 82, to make it removable. It can fold over to the A-side 81 and stuck to the paste (re-stick) element 85 to keep RFID device in an Always-OFF mode.

Alternatively the enhanced RFID device may be formed on the corner 88 of the box 80, which is the A-side 81 and E-side 82 placed on different sides of the surface. In present embodiment the folding angle 87 of the corner 88 is 90 degrees for the default setting of enhanced RFID device. So, for the enhanced RFID device, the default folding angle 87 can vary from 0 to 360 degrees. Different angles have different readable distances, depending on the product design and need. When the angle is 0 or 360 degrees, the enhanced RFID device may be in an OFF mode.

Additionally, the enhanced RFID device has a fixed side and a removable side. The removable side can be part of the box opening seal (not shown). Before opening the box, one must remove the removable side of the enhanced RFID device. The enhanced RFID device default setting is in an Always-ON mode. If someone switches OFF the enhanced RFID device, it means the box is already open.

Figure 9:
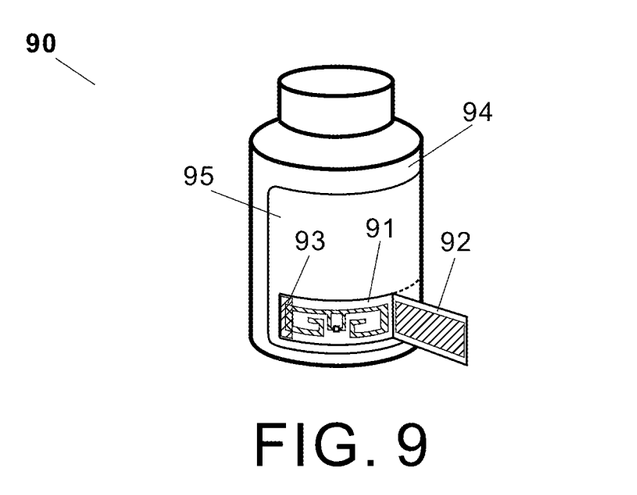
FIG. 9 is a side view of fifth exemplary embodiment of novel enhanced RFID device of FIG. 2, illustrating a sticker type of enhanced RFID device used on a bottle.

Referring now to FIG. 9 is a side view of fifth exemplary embodiment of the novel enhanced RFID device 20 of FIG. 2, showing a sticker (or label) type of enhanced RFID device used on a bottle 90. The RFID device is a part of the sticker 95 stuck on surface 94 of the bottle 90. The back side of the sticker 95 has adhesive, and the region of the removable E-side 92 should be kept adhesive-free, in which the E-side 92 is removed and folded over to the A-side 91 to stick to the re-stick element 93 to keep enhanced RFID device in an Always-OFF mode. The enhanced RFID device may circle the bottle.

Alternatively the enhanced RFID device 20 may be erected on the side of bottle 90. Also, it may be placed on the bottom of bottle 90 or on the top of bottle 90 cover.

Additionally, the enhanced RFID device 20 can be erected on the bottle 90 covering the bottle 90's body (not shown). Since the removable side is on the bottle 90 cap, and the fixed side is on body surface 94 of bottle 90, the bottle cannot be opened unless RFID device 20 is torn. The enhanced RFID device 20's default setting is in an always-ON mode. If someone switches OFF the enhanced RFID device 20, it means that bottle 80 is already open. This means the enhanced RFID device 20 became a security seal for the bottle 80.

Thus, while it has been shown and described and pointed out fundamental novel features of the inventive apparatus and method as applied to exemplary embodiments thereof, it will be understood that various omissions and substitutions and changes in the form and details of the products and methods illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

What is claimed is:

1. An enhanced RFID device embodied in one of inlay, tag, label, sticker or ticket, for securely storing data that is only accessible by at least one compatible reading apparatus when the enhanced RFID device is in an ON mode, and for otherwise preventing access to the stored data, comprising:
an electronic component operable to store the data;
an antenna is connected to the said electronic component in the antenna-side (A-side) of substrate;
at least one enhanced component in at least one enhanced-side (E-side) of substrate, said enhanced component before operated to shield and/or close said antenna, enables increased and/or enhanced electromagnetic induction and/or coupling effect to said antenna, which is said enhanced component enhanced said antenna's performance, to increase readable distances for said antenna and/or said RFID device;
at least one fold line between the said A-side and said at least one E-side of the substrate;
wherein said antenna and said at least one enhanced component are formed by conductive material, on at least one layer of substrate, juxtaposed adjacent to each other not electrically connected, wherein said A-side and said at least one E-side is being formed at least one folding angle to said at least one fold line, to enable users to change readability of distances and switch between ON and OFF mode.

2. The enhanced RFID device of claim 1, wherein said enhanced component is enabled to increase readable distances for the said antenna and/or said RFID device up to 60% or more.

3. The enhanced RFID device of claim 1, wherein said folding angle default setting is in one of 0, 90, 180, 270 and 360 degrees.

4. The enhanced RFID device of claim 1, wherein said folding angle is set to 180 degrees, achieves the farthest readable distances.

5. The enhanced RFID device of claim 1, wherein said enhanced component enable switch to the OFF mode, when the said folding angle is in 0 or 360 degrees.

6. The enhanced RFID device of claim 1, wherein said A-side and said E-side are formed by separate fabrication, using same material or different material to make a combination of said enhanced RFID device.

7. The enhanced RFID device of claim 1, wherein said electronic component and said antenna, or entire said enhanced RFID device is formed by printable electronics technology of printed electronics.

8. The enhanced RFID device of claim 1, further comprising releasable retention component for keep said enhanced RFID device in an Always-ON mode or in an Always-OFF mode.

9. The enhanced RFID device of claim 8, wherein said retention component comprising at least one of a re-stick element, a lock element, a sleeve element, a tab element, a hook-and-loop fastener and a snap button.

10. The enhanced RFID device of claim 1, wherein said A-side and said E-side, either side is fixed to a product/object or is part of a product/object, with the other side removable.

11. A method, comprising: providing an enhanced RFID device having at least one enhanced component juxtaposed adjacent to an antenna, and having an electronic component connecting with said antenna, wherein at least one said enhanced component and said antenna are formed by conductive material, on at least one layer of substrate, juxtaposed adjacent to each other not electrically connected, such that at least one said enhanced component before operated to shield and/or close said antenna, enables increased and/or enhanced electromagnetic induction and/or coupling effect to said antenna, which is said enhanced component enhanced said antenna's performance, to increase readable distances for said RFID device, to increase readability of said RFID device.

12. The method of claim 11, wherein further comprising: at least one fold line between said antenna and said at least one enhanced component.

13. The method of claim 12, wherein said enhanced component with said fold line enables user to switch OFF tagged product after point of sale, and then switch ON if necessary.

14. The method of claim 12, wherein further comprising: a folding angle enable user to change enhance RFID device of readability, when said folding angle is set to 180 degrees, and achieves the farthest readable distances.

15. The method of claim 14, wherein said folding angle is set to 0 or 360 degrees, the enhanced RFID device is in an OFF mode.

16. The method of claim 11, wherein further comprising: at least one retention component, enabled to keep enhanced RFID device in an Always-ON or in an Always-OFF mode.

17. The method of claim 11, wherein said enhanced RFID device is one of inlay, tag, label, sticker or ticket.

18. The method of claim 11, wherein said enhanced RFID device is formed by printed electronics.

19. The method of claim 11, wherein said enhanced RFID device is formed by roll-to-roll processing.

20. The method of claim 11, wherein said antenna and said electronic component can be further formed as a common RFID device first, and then combined with said enhanced component.

* * * * *